US007722498B2

(12) United States Patent
Kawasaki et al.

(10) Patent No.: US 7,722,498 B2
(45) Date of Patent: May 25, 2010

(54) CONTROL DEVICE AND METHOD FOR HYBRID ELECTRIC VEHICLE

(75) Inventors: Shingo Kawasaki, Kariya (JP); Akiyoshi Morii, Kariya (JP)

(73) Assignee: DENSO CORPORATION, Kariya (JP)

( * ) Notice: Subject to any disclaimer, the term of this patent is extended or adjusted under 35 U.S.C. 154(b) by 419 days.

(21) Appl. No.: 11/798,101

(22) Filed: May 10, 2007

(65) Prior Publication Data

US 2008/0045382 A1 Feb. 21, 2008

(30) Foreign Application Priority Data

Jun. 21, 2006 (JP) ............................ 2006-170831

(51) Int. Cl.

| | |
|---|---|
| ***B60K 1/02*** | (2006.01) |
| ***H02P 1/00*** | (2006.01) |
| ***H02P 3/00*** | (2006.01) |
| ***H02P 7/00*** | (2006.01) |
| ***B60W 10/06*** | (2006.01) |
| ***B60W 20/00*** | (2006.01) |
| ***B60W 10/04*** | (2006.01) |
| ***G06F 19/00*** | (2006.01) |
| ***G06G 7/70*** | (2006.01) |

(52) U.S. Cl. .............................. 477/3; 477/7; 903/930; 701/101; 701/111; 180/65.28; 180/65.285; 318/34

(58) Field of Classification Search ..................... 477/3, 477/7; 180/65, 21, 265, 65.28, 65.285; 903/930; 701/22; 318/34

See application file for complete search history.

(56) References Cited

U.S. PATENT DOCUMENTS

| | | | | |
|---|---|---|---|---|
| 6,991,054 | B2 * | 1/2006 | Takaoka et al. | 180/65.235 |
| 7,023,150 | B2 * | 4/2006 | Hisada et al. | 318/34 |
| 7,219,757 | B2 * | 5/2007 | Tomita et al. | 180/65.275 |
| 7,426,972 | B2 * | 9/2008 | Tabata et al. | 180/65.22 |
| 2006/0266323 | A1 * | 11/2006 | Ogimura | 123/198 A |

FOREIGN PATENT DOCUMENTS

| | | |
|---|---|---|
| JP | 2005-090307 | 4/2005 |

* cited by examiner

*Primary Examiner*—Tisha D Lewis
(74) *Attorney, Agent, or Firm*—Nixon & Vanderhye P.C.

(57) ABSTRACT

In hybrid electric vehicle control, when an engine is cranked by the torque of a first motor-generator to start the engine, the torque of the first motor-generator is corrected according to the crankshaft angle of the engine to prevent the amount of increase in engine rotation speed from fluctuating. Fluctuation in inertia torque is reduced through this control of the torque of the first motor-generator to reduce fluctuation in the cranking reaction force torque exerted on a drive axle. Further, the torque of a second motor-generator is so controlled to cancel out this cranking reaction force torque. Thus, the cranking reaction force torque exerted on the drive axle is accurately canceled out through control of the torque of the second motor-generator to suppress fluctuation in the torque of the drive axle.

10 Claims, 7 Drawing Sheets

CONTROL DEVICE AND METHOD FOR HYBRID ELECTRIC VEHICLE

CROSS REFERENCE TO RELATED APPLICATION

This application is based on and incorporates herein by reference Japanese Patent Application No. 2006-170831 filed on Jun. 21, 2006.

FIELD OF THE INVENTION

The present invention relates to a control device and method for a hybrid electric vehicle, in which an internal combustion engine, a first motor-generator and a drive shaft of wheels are coupled together through a power split device and further a second motor-generator is coupled with the drive shaft.

BACKGROUND OF THE INVENTION

In recent years, demand for engine-motor hybrid electric vehicles has been rapidly growing because of social needs for the improvement of fuel economy and reduction in exhaust emission. Many of the hybrid electric vehicles currently on the market are constructed as described in JP 2005-90307A. These vehicles include an internal combustion engine, a first motor-generator (MG) mainly used as a generator, and a second motor-generator (MG) that mainly drives wheels. In these vehicles, the crankshaft of the internal combustion engine is coupled with the carrier of the planetary gear of a planetary gear set as a power split device, the first MG is coupled with the sun gear of the planetary gear set, and the second MG and the drive shaft of wheels are coupled with its ring gear.

When the engine is cranked by the first MG to start the engine, part of the torque Tmg1 of the first MG (i.e., cranking torque) is transmitted to the drive shaft by the planetary gear set as illustrated in FIG. 2 and FIG. 3. At the same time, inertia torque (Kinr×Dne) arising from the inertia of the first MG and the engine is produced by change in rotation speed due to cranking. Therefore, cranking reaction force torque Tep equivalent to the sum of the torque (−Kgear×Tmg1) transmitted from the first MG and the inertia torque (Kinr×Dne) is exerted on the drive shaft.

As illustrated in FIG. 3 and FIG. 4, when the variation Dne (amount of increase in rotation speed) in the rotation speed of the engine fluctuates by variation in the cylinder pressure of the engine during cranking, the inertia torque fluctuates. In FIG. 4, EXP and COMP represent an explosion stroke and a compression stroke in each cylinders (#1, #2, #3, etc.) As a result, the cranking reaction force torque Tep exerted on the drive shaft fluctuates. Therefore, if no measure is taken, the torque Td of the drive shaft fluctuates and uncomfortable vehicle vibration may be adversely produced.

To cope with this, in JP 2005-90307A, when the engine is cranked by the first MG to start the engine, the torque of the second MG is so controlled that torque transmitted from the first MG to the drive shaft and inertia torque (pulsating torque) that fluctuates in conjunction with cranking are canceled out by the torque of the second MG. Thus, fluctuation in the torque of the drive shaft is thereby suppressed.

However, it is required to cancel out the inertia torque (pulsating torque) that largely fluctuates in conjunction with cranking by the torque of the second MG. In order to accurately cancel out the largely fluctuating inertia torque through control of the torque of second MG and thereby accurately suppress fluctuation in the torque of the drive shaft, it is required to shorten the operation period for control of the torque of the second MG. This leads to an increased computation load on a control device (electronic controller).

SUMMARY OF THE INVENTION

It is therefore an object of the invention to provide a control device and method for a hybrid electric vehicle, which suppresses fluctuation in the torque of a drive shaft without increasing a computation load.

According to one aspect, a control device is provided for a hybrid electric vehicle, in which an internal combustion engine, a first motor-generator and a drive axle of wheels are coupled together through a power split device, and a second motor-generator is coupled with the drive axle. The control device controls a torque of a first motor-generator so that a fluctuation of variation in a rotation speed of the internal combustion engine is reduced, when the internal combustion engine is in predetermined condition. The control device further controls a torque of the second motor generator to cancel out the torque exerted on the drive axle, when the internal combustion engine is in the predetermined condition. The predetermined condition is at least one of starting and stopping of the internal combustion engine by the torque of the first motor-generator.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
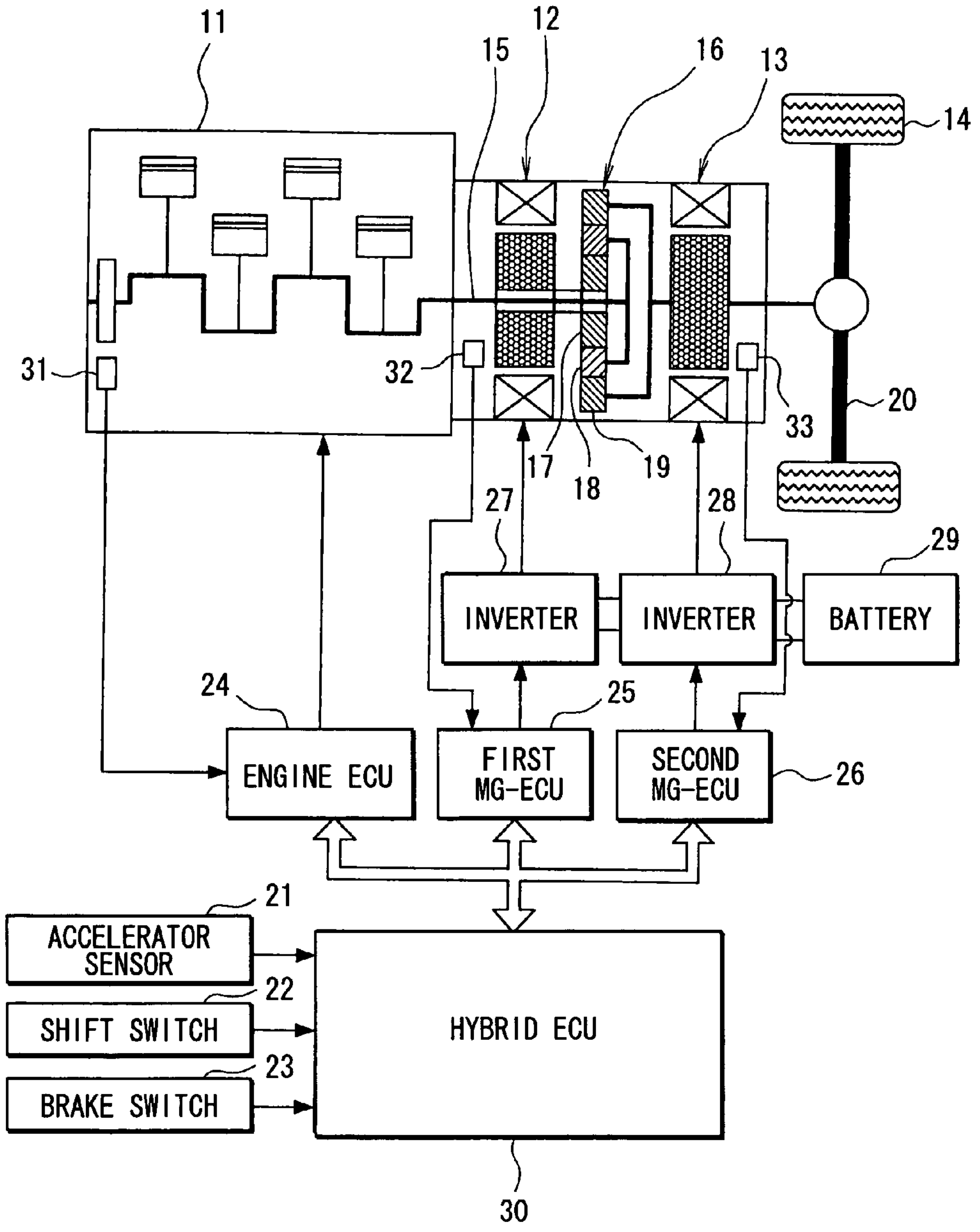
FIG. 1 is a schematic diagram illustrating a drive system for a hybrid electric vehicle in a first embodiment of the invention.

Referring first to FIG. 1, a hybrid electric vehicle is mounted with an internal combustion engine 11, a first motor-generator (first MG) 12, and a second motor-generator (second MG) 13. The engine 11 and the second MG 13 provide power sources for driving wheels 14. Power from the crankshaft 15 of the engine 11 is divided or split into two systems by a planetary gear set 16 as a power split device. The planetary gear set 16 includes a sun gear 17 that rotates in the center, a planetary gear 18 that rotates and moves around the sun gear 17, and a ring gear 19 that rotates around the planetary gear 18. The planetary gear 18 is coupled with the crankshaft 15 of the engine 11 through a carrier, not shown. The ring gear 19 is coupled with the rotary shaft of the second MG 13 and the drive axle 20 of wheels 14. The sun gear 17 is coupled with the rotary shaft of the first MG 12 mainly used as a generator.

The first MG 12 and the second MG 13 respectively produce and receive electric power to and from a battery 29 through inverters 27, 28. On the engine 11, a crankshaft angle sensor 31 that outputs a pulse signal each time the crankshaft 15 rotates through a predetermined crankshaft angle. Based on the output signal of the crankshaft angle sensor 31, a crankshaft angle or engine rotation speed is detected. On the first MG 12 and the second MG 13, in addition, rotational position sensors 32, 33 are provided respectively for detecting the rotational positions of rotors. Based on the output signals of the rotational position sensors 32, 33, the rotation speed of the first MG 12 and the rotation speed of the second MG 13 are detected.

An electronic control unit for a hybrid vehicle (hybrid ECU) 30 is a computer for comprehensively controlling the entire hybrid electric vehicle. It reads the output signals of various sensors and switches and detects the operating state of the vehicle and determines a requested driving mode. The sensors and switches whose output signals are read by the hybrid ECU 30 include: an accelerator sensor 21 for detecting an accelerator opening; a shift switch 22 for detecting the shift range or position of an automatic transmission; a brake switch 23 for detecting brake operation; and the like. The hybrid ECU 30 transmits and receives control signals to and from the following ECUs: an engine ECU 24 for controlling the operation of the engine 11; a first MG-ECU 25 for controlling the operation of the first MG 12; and a second MG-ECU 26 for controlling the operation of the second MG 13. The hybrid ECU 30 controls the operations of the engine 11, first MG 12, and second MG 13 by the individual ECUs 24 to 26 according to a requested driving mode.

On vehicle starting or during low- or medium-speed traveling (ranges in which the fuel efficiency of the engine 11 is low), a motor driving mode is selected. In this mode, the engine 11 is not operated and the vehicle travels only by the power from the second MG 13. In motor driving mode, the drive axle 20 is driven only by the power from the second MG 13 to drive the wheels 14. At this time, part of the turning force of the second MG 13 is transmitted to the ring gear 19 of the planetary gear set 16, and the ring gear 19 is rotated. As a result, the planetary gear 18 rotates about its axis and the sun gear 17 rotates, so that the first MG 12 is thereby driven and rotated to operate as a generator.

When the engine 11 is to be started while the vehicle is in the motor driving mode, the first MG 12 is operated as a motor to produce a torque that is exerted on the sun gear 17 of the planetary gear set 16. The revolving speed of the planetary gear 18 is thereby varied along the circumference of the sun gear 17, and the crankshaft 15 of the engine 11 is rotationally driven to start the engine 11.

In normal driving, the following operation is performed so as to maximize the fuel efficiency of the engine 11: the power of the crankshaft 15 of the engine 11 is divided into two systems on the first MG 12 side and on the drive axle 20 side (rotary shaft side of the second MG 13) by the planetary gear set 16; the drive axle 20 is driven by the output of one system to drive the wheels 14; the first MG 12 is driven by the output of the other system, and electric power thereby generated is supplied to the second MG 13; and thus the wheels 14 are also driven by the power of the second MG 13.

Rapid acceleration requires torque most. At this time, therefore, the direct current (DC) electric power of the battery 29 is added to the electric power generated in normal driving. It is then converted into alternating current (AC) electric power through the inverter 28. This electric power is supplied to the second MG 13 to operate the second MG 13. Thus, the drive axle 20 is driven by the power of both the engine 11 and the second MG 13 to drive the wheels 14, so that acceleration performance is thereby enhanced.

On deceleration or braking, the wheels 14 drive and cause the second MG 13 to operate as a generator. The deceleration energy and the braking energy of the vehicle is converted into electric power, and the battery 29 is charged with this electric power.

Figure 2:
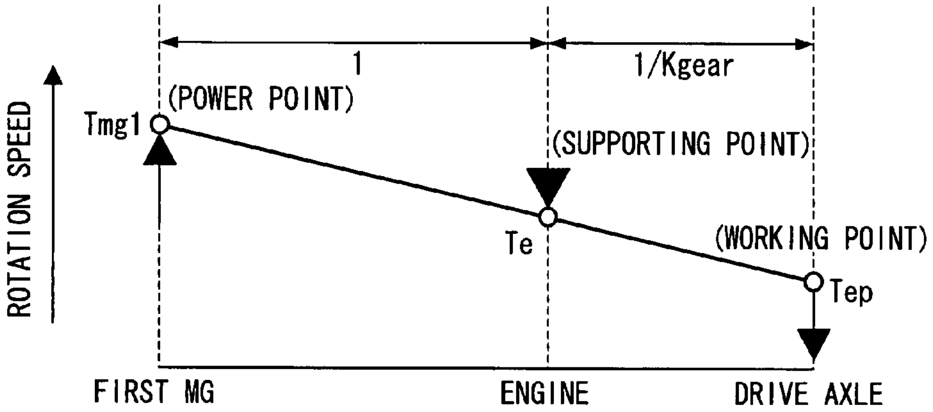
FIG. 2 is a nomographic chart illustrating a relation among rotation speeds of various parts during cranking in the drive system.
Figure 3:
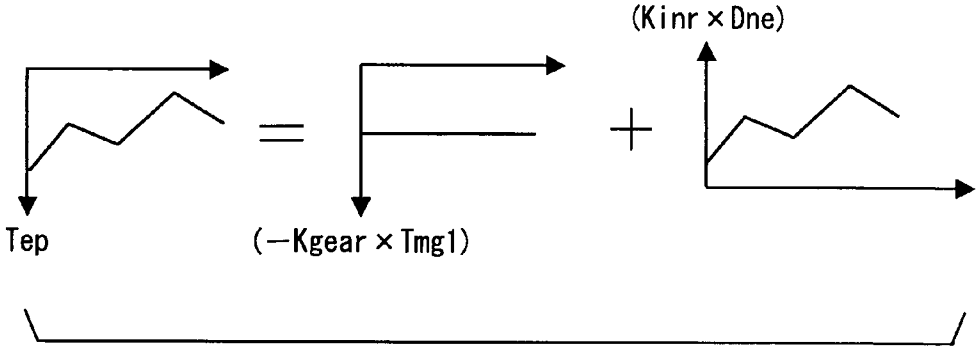
FIG. 3 is a diagram explaining cranking reaction force torque exerted on a drive shaft in the drive system.

When the engine 11 is cranked by the first MG 12 to start the engine 11, as illustrated in FIG. 2 and FIG. 3, part of the torque Tmg1 of first MG 12 (i.e., cranking torque) is transmitted to the drive axle 20 by the planetary gear set 16. At the same time, inertia torque arising from the inertia of the first MG 12 and the engine 11 is produced by change in rotation speed due to cranking. For this reason, cranking reaction force torque Tep equivalent to the sum of the torque (−Kgear×Tmg1) transmitted from the first MG 12 and the inertia torque (Kinr×Dne) is exerted on the drive axle 20.

$$Tep=(-K\mathrm{gear}\times Tmg1)+(Kinr\times Dne)$$

where, Kgear is the gear ratio between the sun gear 17 and the ring gear 19; Kinr is a coefficient based on the inertia of the first MG 12 and the engine 11; and Dne is variation (amount of increase) in engine rotation speed Ne. When the ring gear 19 and the drive axle 20 are coupled with each other through a speed reduction mechanism, the speed reduction ratio of the speed reduction mechanism is also incorporated into the gear ratio Kgear.

Figure 4:
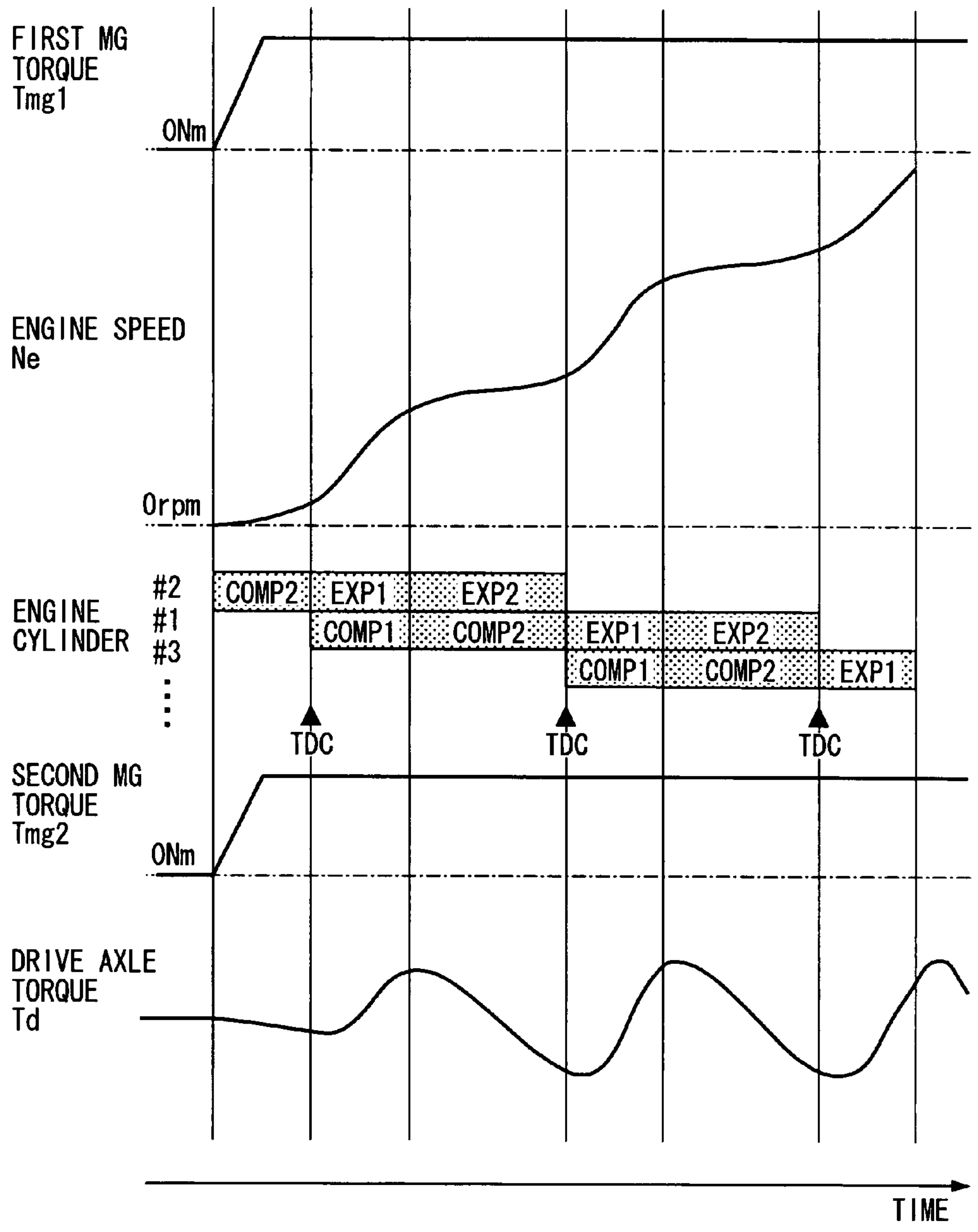
FIG. 4 is a time diagram illustrating an example of control executed when an engine is started in the drive system.

As illustrated in FIG. 3 and FIG. 4, when the amount of increase Dne in the rotation speed Ne of the engine 11 fluctuates due to fluctuation in the cylinder pressure of the engine 11 during cranking, the inertia torque (Kinr×Dne) fluctuates. As a result, the cranking reaction force torque Tep exerted on the drive axle 20 also fluctuates. Therefore, if no measure is taken, the torque Td of the drive axle 20 fluctuates, and uncomfortable vehicle vibration will be produced.

Figure 6:
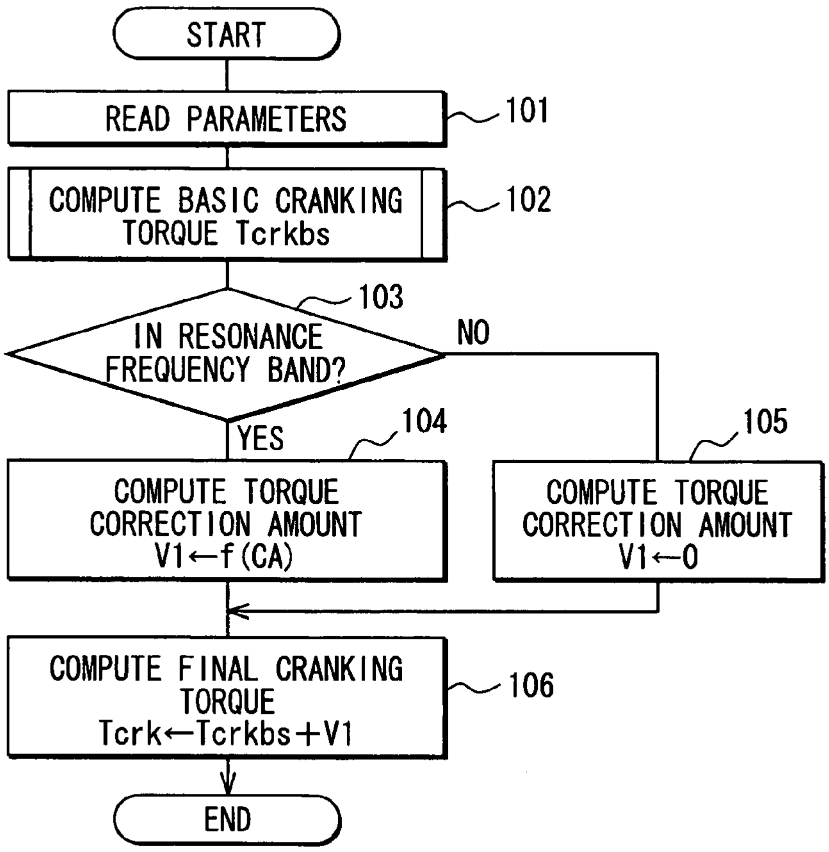
FIG. 6 is a flowchart illustrating processing executed by a cranking torque computation program in the first embodiment.

Consequently, the hybrid ECU 30 executes the cranking torque computation program illustrated in FIG. 6 and thereby takes the following measure when the engine 11 is cranked by the torque of the first MG 12 to start the engine 11: the hybrid ECU 30 corrects basic cranking torque Tcrkbs according to the crankshaft angle of the engine 11, and thereby determines such a cranking torque Tcrk as to reduce fluctuation in the amount of increase in the engine rotation speed Ne. The torque of the first MG 12 is so controlled that this cranking torque Tcrk is produced, and fluctuation in the amount of increase in engine rotation speed Ne is thereby substantially eliminated to reduce fluctuation in inertia torque. These functions operate as a first MG torque controlling means.

Figure 5:
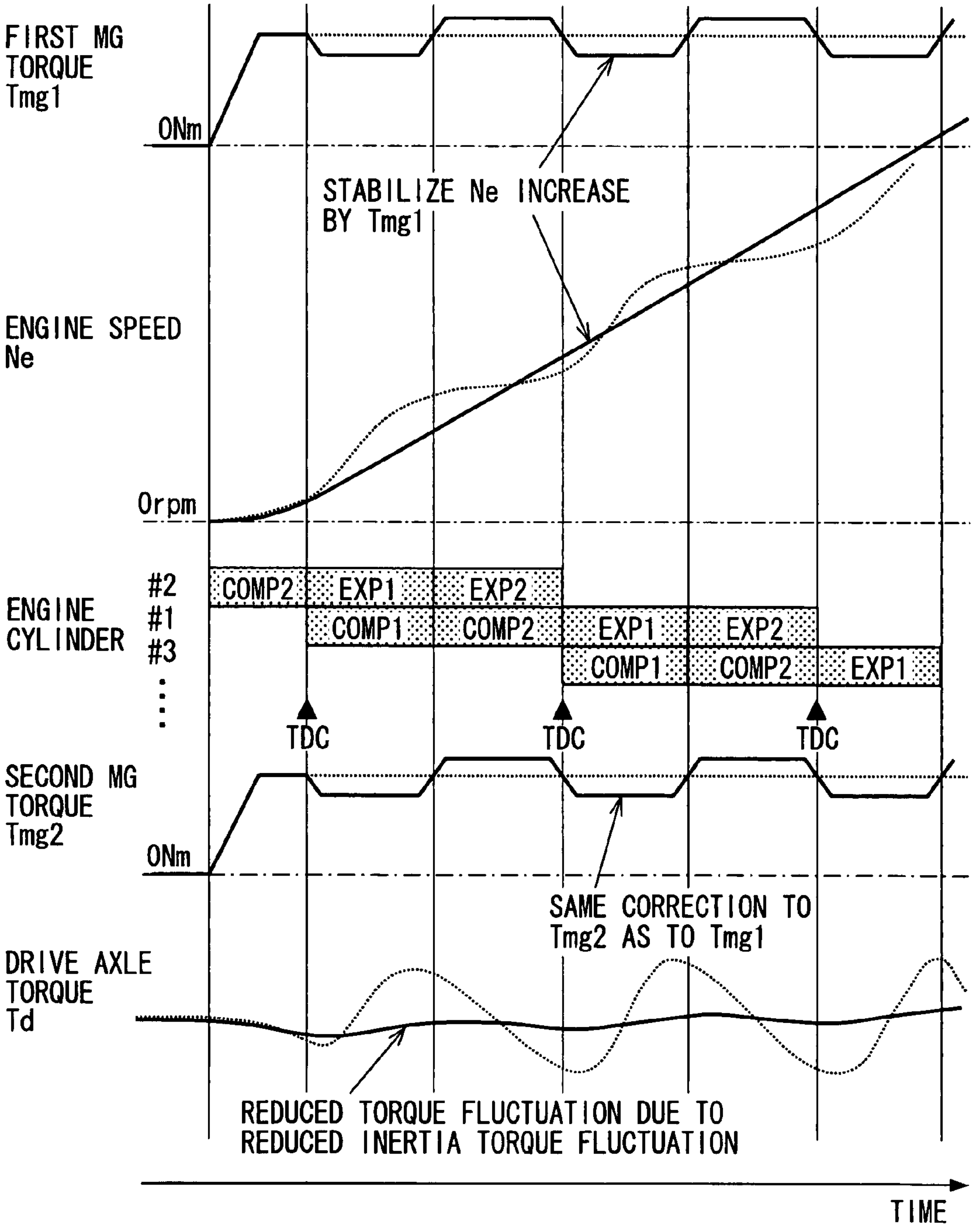
FIG. 5 is a time diagram illustrating an example of control executed when an engine is started in the first embodiment.

It is assumed that the engine 11 is started by the cranking torque of the first MG 12 and this torque is made substantially constant as illustrated in FIG. 4. In this figure, TDC indicates the top dead center of a piston, COMP1 and COMP2 indicate the former half (first half) and the latter half (second half) of the compression stroke of each cylinder respectively, and EXP1 and EXP2 indicate the former half and the latter half of the explosion stroke of the same respectively. When each cylinder of the engine 11 is in the latter half of the compression stroke (COMP2), the amount of increase in engine rotation speed Ne is reduced. When each cylinder is in the former half of the explosion stroke (EXP1), the amount of increase in engine rotation speed Ne is increased. To cope with this, in the first embodiment, as illustrated in FIG. 5, at a crankshaft angle corresponding to the latter half of the compression stroke (COMP2) of each cylinder, the cranking torque of the first MG 12 is corrected to increase thereby limiting the amount of increase in engine rotation speed Ne from being reduced. At a crankshaft angle corresponding to the former half of the explosion stroke (EXP1) of each cylinder, the cranking torque of the first MG 12 is corrected to reduce thereby limiting the amount of increase in engine rotation speed Ne from being increased. Thus, the amount of increase in engine rotation speed Ne is made substantially constant to reduce fluctuation in inertia torque.

The following can be implemented by correcting the torque of the first MG 12 so that the amount of increase in engine rotation speed Ne is reduced when the engine 11 is started by the torque of the first MG 12: the amount of increase in engine rotation speed Ne can be made substantially constant to reduce fluctuation in inertia torque; and consequently, fluctuation in the cranking reaction force torque Tep exerted on the drive axle 20 can be reduced. The cranking reaction force torque Tep is equal to the sum of the torque transmitted from the first MG 12 and the inertia torque.

Figure 7:
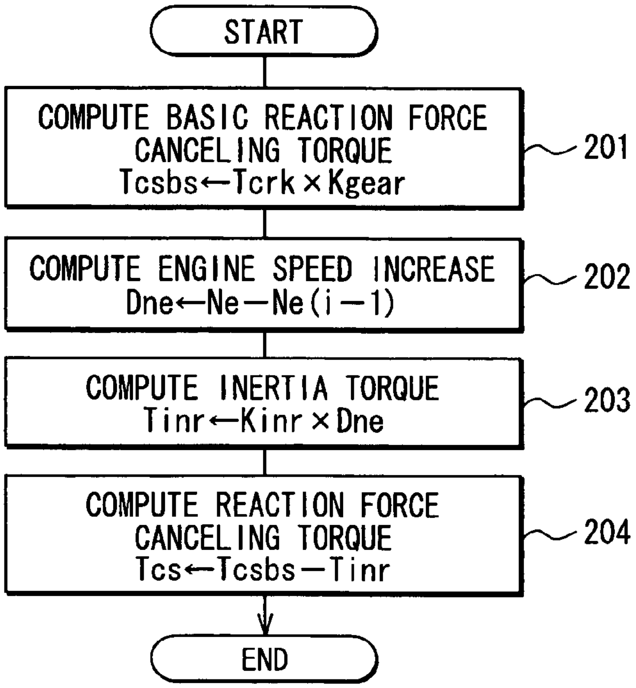
FIG. 7 is a flowchart illustrating processing executed by a reaction force canceling torque computation program in the first embodiment.

In addition, the hybrid ECU 30 executes the reaction force canceling torque computation program illustrated in FIG. 7 and thereby takes the following measure when the engine 11 is started by the torque of the first MG 12: the hybrid ECU 30 computes the basic reaction force canceling torque Tcsbs identical in magnitude with the torque transmitted from the first MG 12, and further computes the inertia torque Tinr arising from the inertia of the first MG 12 and the engine 11; and it subtracts the inertia torque Tinr from the basic reaction force canceling torque Tcsbs to determine reaction force canceling torque Tcs. That is, the hybrid ECU 30 determines a torque whose magnitude is equal to that of the cranking reaction force torque Tep exerted on the drive axle 20 and whose direction is opposite to that of the cranking reaction force torque Tep. The torque of the second MG 13 is so controlled as to produce a torque equal to that obtained by adding this reaction force canceling torque Tcs to the requested torque of the second MG 13. Thus, the cranking reaction force torque Tep exerted on the drive axle 20 is canceled out by the torque of the second MG 13. These functions operate as a second MG torque controlling means.

The following can be implemented by: reducing fluctuation in inertia torque through the above control of the torque of the first MG 12 to reduce fluctuation in the cranking reaction force torque Tep exerted on the drive axle 20; and then controlling the torque of the second MG 13 so as to cancel out the cranking reaction force torque Tep (i.e., torque that does not fluctuate so much): the cranking reaction force torque Tep exerted on the drive axle 20 can be accurately canceled out through control of the torque of the second MG 13.

For the above operation, the hybrid ECU 30 executes a cranking torque computation program illustrated in FIG. 6, and a reaction force canceling torque computation program illustrated in FIG. 7.

The cranking torque computation program illustrated in FIG. 6 is executed at predetermined intervals (e.g., every 5 milliseconds) when the engine 11 is started by the torque of the first MG 12. After this program is started, at step 101, the hybrid ECU 30 reads parameters, such as engine rotation speed Ne and crankshaft angle CA, required for this control.

Figure 8:
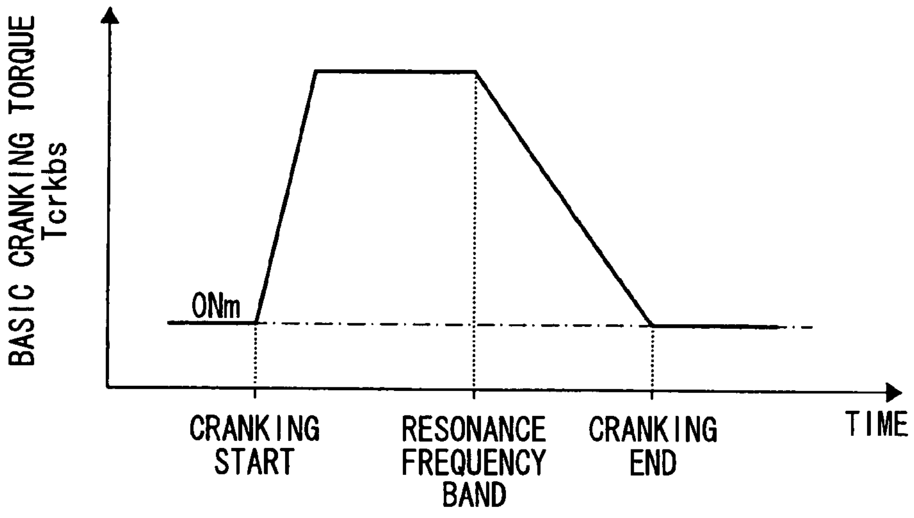
FIG. 8 is a time diagram illustrating an example of change of basic cranking torque.

Thereafter, the hybrid ECU 30 proceeds to step 102, and computes a basic cranking torque Tcrkbs based on the engine rotation speed Ne and the like. As indicated by a time diagram in FIG. 8, the basic cranking torque Tcrkbs is so set that the following is implemented: immediately after cranking of the engine 11 is started, the basic cranking torque Tcrkbs rapidly increases to the vicinity of its maximum value; thereafter, the basic cranking torque Tcrkbs is kept in proximity to the maximum value until the engine rotation speed Ne passes through a resonance frequency band; thus, the engine rotation speed Ne is rapidly increased to rapidly pass through the resonance frequency band; and after the engine rotation speed Ne passes through the resonance frequency band, the basic cranking torque Tcrkbs is gradually reduced.

Thereafter, the hybrid ECU 30 proceeds to step 103, and checks whether or not the present engine rotation speed Ne is in the resonance frequency band (e.g., band of near 300 rpm).

When the hybrid ECU 30 determines at step 103 that the engine rotation speed Ne is in the resonance frequency band, it executes step 104. Then, referring to the map data of torque correction amount V1 illustrated in FIG. 9, it computes a torque correction amount V1 corresponding to the present crankshaft angle CA of the engine 11. The map data of torque correction amount V1 illustrated in FIG. 9 is so set that the following is implemented: at a crankshaft angle equivalent to the latter half of the compression stroke (COMP2) of each cylinder of the engine 11, the torque correction amount V1 takes a positive value; and at a crankshaft angle equivalent to the former half of the explosion stroke (EXP1) of each cylinder, the torque correction amount V1 takes a negative value.

Figure 9:
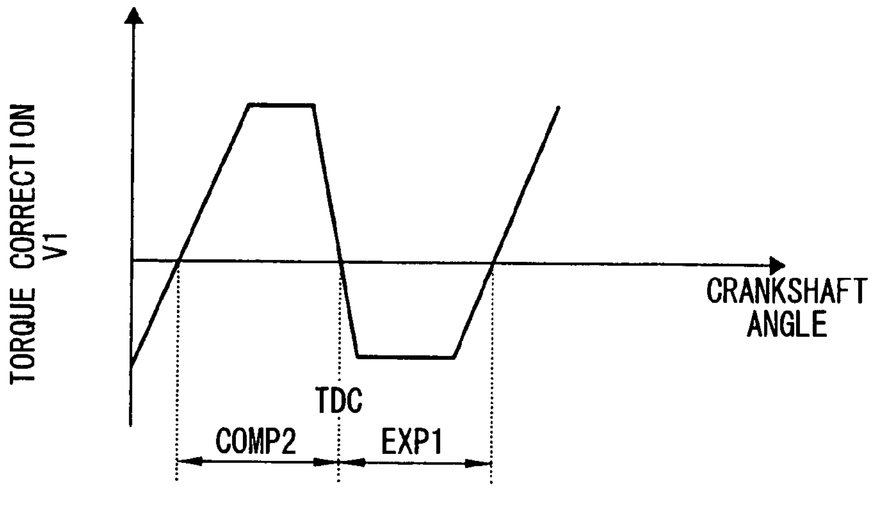
FIG. 9 is a graph illustrating an example of relation between a crankshaft angle and a torque correction amount.

The torque correction amount V1 may be varied according to crankshaft angle (CA) as in, the example illustrated in FIG. 9 by taking the following measure: the torque correction amount V1 is set based on the engine stop position (crankshaft angle) immediately before start of cranking and the time that has passed after start of cranking.

When the hybrid ECU 30 determines at step 103 that the engine rotation speed Ne is not in the resonance frequency band, it executes step 105 and sets the torque correction amount V1 to zero.

Thereafter, the hybrid ECU 30 executes step 106, and adds the torque correction amount V1 to the basic cranking torque Tcrkbs to determine a final cranking torque Tcrk.

$$Tcrk = Tcrkbs + V1$$

The torque of the first MG 12 is so controlled as to produce this cranking torque Tcrk. Thus, when the engine 11 is cranked by the torque of the first MG 12 to start the engine 11 and the engine rotation speed Ne is in the resonance frequency band, fluctuation in inertia torque is reduced by taking the following measure: at a crankshaft angle corresponding to the latter half of the compression stroke (COMP2) of each cylinder of the engine 11, the cranking torque Tcrk is increased and corrected to prevent the amount of increase in engine rotation speed from being reduced; at a crankshaft angle corresponding to the former half of the explosion stroke (EXP1) of each cylinder, the cranking torque Tcrk is reduced and corrected to prevent the amount of increase in engine rotation speed from being increased; and thus the amount of increase in engine rotation speed is made substantially constant.

The reaction force canceling torque computation program illustrated in FIG. 7 is executed at predetermined intervals (e.g., every 5 milliseconds) when the engine 11 is started by the torque of the first MG 12. After this program is started, at step 201, the hybrid ECU 30 multiplies the cranking torque Tcrk (torque of the first MG 12) by the gear ratio Kgear. It thereby determines the basic reaction force canceling torque Tcsbs that is identical in magnitude with the torque transmitted from the first MG 12.

$$Tcsbs=Tcrk\times Kgear$$

Thereafter, the hybrid ECU 30 executes step 202, and determines the difference between the engine rotation speed Ne of this time and the engine rotation speed Ne(i−1) of the previous time. It takes this difference as the amount of increase Dne in engine rotation speed Ne.

$$Dne=Ne-Ne(i-1)$$

Thereafter, the hybrid ECU 30 executes step 203, and multiplies the coefficient Kinr based on the inertia of the first MG 12 and the engine 11 by the amount of increase Dne in engine rotation speed Ne. Thus it determines the inertia torque Tinr arising from the inertia of the first MG 12 and the engine 11.

$$Tinr=Kinr\times Dne$$

For the coefficient Kinr, values computed beforehand based on design data, experimental data, or the like are stored in the ROM of the hybrid ECU 30 or the like.

Thereafter, at step 204, the hybrid ECU 30 subtracts the inertia torque Tinr from the basic reaction force canceling torque Tcsbs to determine the reaction force canceling torque Tcs. This torque is equivalent to a torque whose magnitude is equal to that of the cranking reaction force torque Tep exerted on the drive axle 20 and whose direction is opposite to that of the cranking reaction force torque Tep.

$$Tcs=Tcsbs-Tinr$$

The torque of the second MG 13 is so controlled as to produce a torque equal to that obtained by adding this reaction force canceling torque Tcs to the requested torque of the second MG 13. Thus the cranking reaction force torque Tep exerted on the drive axle 20 is canceled out by the torque of the second MG 13.

The first embodiment described above takes the measure illustrated in the time diagram in FIG. 5 when the engine 11 is cranked by the torque of the first MG 12 to start the engine 11: the torque of the first MG 12 (cranking torque) is corrected according to the crankshaft angle of the engine 11, and the amount of increase Dne in engine rotation speed Ne is thereby prevented from fluctuating. Therefore, the amount of increase Dne in engine rotation speed Ne can be made substantially constant to reduce fluctuation in inertia torque. Consequently, fluctuation in the cranking reaction force torque Tep (=torque transmitted from the first MG 12+inertia torque) exerted on the drive axle 20 can be reduced.

As described above, fluctuation in inertia torque is reduced through control of the torque of the first MG 12 to reduce fluctuation in the cranking reaction force torque Tep exerted on the drive axle 20. In addition, the torque of the second MG 13 is so controlled as to cancel out the cranking reaction force torque Tep, that is, torque that does not fluctuate so much. As a result, the cranking reaction force torque Tep exerted on the drive axle 20 can be accurately canceled out through control of the torque of the second MG 13 without accelerating the second MG 13 torque control so much. Thus, when the engine 11 is started by the torque of the first MG 12, fluctuation in the torque of the drive axle 20 can be accurately suppressed to reduce vehicle vibration. Further, computation loads on the hybrid ECU 30 and the MG-ECU 26 can be lessened. Even though a calculated value of inertia torque slightly deviates from the actual inertia torque, fluctuation in inertia torque can be reduced; therefore, vehicle vibration can be reduced.

The first embodiment takes the following measure when the engine 11 is started by the torque of the first MG 12: when the engine rotation speed Ne is in the resonance frequency band, the torque of the first MG 12 is so controlled that the amount of increase Dne in engine rotation speed Ne is reduced. Therefore, resonance shock that occurs when the engine is started and the engine rotation speed Ne passes through the resonance frequency band can be reduced.

Second Embodiment

The first embodiment is so constructed that when the engine 11 is started by the first MG 12, the torque of the first MG 12 is corrected according to the crankshaft angle of the engine 11 and the amount of increase Dne in engine rotation speed Ne is thereby prevented from fluctuating. The second embodiment is so constructed that the amount of increase Dne in engine rotation speed Ne is prevented from fluctuating by taking the following measure: when the engine 11 is started by the first MG 12, the cranking torque computation program illustrated in FIG. 10 is executed, and the torque of the first MG 12 is feedback (F/B) controlled so as to make the amount of increase in engine rotation speed Ne agree with a target amount of increase.

Figure 10:
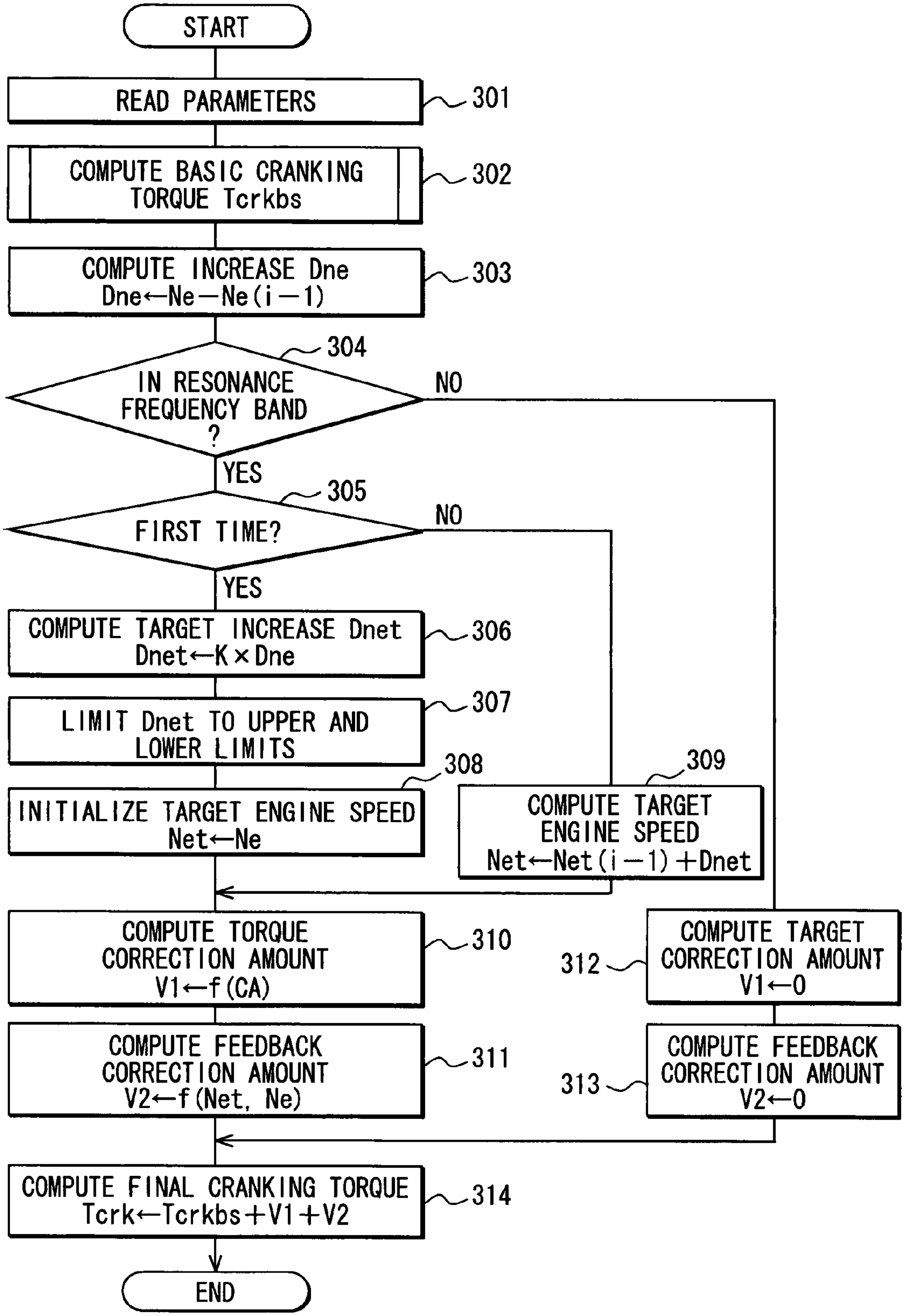
FIG. 10 is a flowchart illustrating processing executed by a cranking torque computation program in a second embodiment of the invention.

The cranking torque computation program illustrated in FIG. 10 is executed out at predetermined intervals (e.g., every 5 milliseconds) when the engine 11 is started by the torque of the first MG 12. After this program is started, at step 301, the hybrid ECU 30 reads parameters, such as engine rotation speed Ne and crankshaft angle CA, required for this control.

Thereafter, the hybrid ECU 30 executes step 302, and computes the basic cranking torque Tcrkbs based on the engine rotation speed Ne and the like. Thereafter, the hybrid ECU 30 executes step 303, and determines the difference between the engine rotation speed Ne of this time and the engine rotation speed Ne(i−1) of the previous time. It takes this difference as the amount of increase Dne in the engine rotation speed Ne.

$$Dne=Ne-Ne(i-1)$$

Thereafter, the hybrid ECU executes step 304, and checks whether or not the present engine rotation speed Ne is in the resonance frequency band (e.g., band of near 300 rpm).

When the hybrid ECU 30 determines at step 304 that the engine rotation speed Ne is in the resonance frequency band, it executes step 305. Then it checks whether or not the present operation period is the first operation period immediately after it was determined that the engine rotation speed Ne was in the resonance frequency band. When the present operation period is the first operation period, the hybrid ECU 30 executes step 306 and multiplies the amount of increase Dne in engine rotation speed Ne by a coefficient K to determine a target amount of increase Dnet in engine rotation speed Ne.

$$Dnet=K\times Dne$$

In the case of an engine 11 whose cylinder pressure does not fluctuate so much during cranking, a fixed value may be set for the coefficient K. In the case of an engine 11 whose cylinder pressure largely fluctuates during cranking, it is advisable to take the following measure: at a crankshaft angle corresponding to the latter half of the compression stroke (COMP2) of each cylinder of the engine 11, the coefficient K is increased; and at a crankshaft angle corresponding to the former half of the explosion stroke (EXP1) of each cylinder, the coefficient K is reduced. The engine 11 has the following property: when each cylinder is in the latter half of the compression stroke (COMP2), the amount of increase in engine rotation speed Ne is reduced, and when each cylinder is in the former half of the explosion stroke (EXP1), the amount of increase in engine rotation speed is increased. Therefore, the target amount of increase Dnet can be made substantially constant by increasing the coefficient K when each cylinder is in the later half of the compression stroke (COMP2) and reducing the coefficient K when each cylinder is in the former half of the explosion stroke (EXP1).

The coefficient K may be increased when each cylinder is in the latter half of the compression stroke (COMP2) and reduced when each cylinder is in the former half of the explosion stroke (EXP1), by taking the following measure: the coefficient K is set based on the engine stop position (crankshaft angle) immediately before start of cranking and the time that has passed after start of cranking.

Thereafter, the hybrid ECU 30 executes step 307. Then it subjects the target amount of increase Dnet in engine rotation speed Ne to guard processing using an upper limit guard value GDH and a lower limit guard value GDL to prevent the target amount of increase Dnet from becoming too large or too small. This prevents a feedback correction amount from becoming excessively large to cause the amount of increase in engine rotation speed to fluctuate.

Thereafter, the hybrid ECU 30 executes step 308, and initializes the target engine speed Net by substituting the present engine rotation speed Ne for the initial value of target engine rotation speed Net.

$$Net=Ne$$

When the hybrid ECU 30 determines at step 305 that the present operation period is not the first operation period immediately after it was determined that the engine rotation speed Ne was in the resonance frequency band, it executes step 309. That is, when the hybrid ECU 30 determines that the present operation period is the second or a subsequent operation period after it was determined that the engine rotation speed was in the resonance frequency band, it executes step 309. Then it adds the target amount of increase Dnet to the target engine rotation speed Net(i−1) of the previous time to determine the target engine rotation speed Net of this time.

$$Net=Net(i-1)+Dnet$$

Thereafter, the hybrid ECU 30 executes step 310. Then, referring to the map data of torque correction amount V1 illustrated in FIG. 9, it computes the torque correction amount V1 corresponding to the present crankshaft angle of the engine 11. Thereafter, it executes step 311, and computes a feedback correction amount V2 so that the deviation between the target engine rotation speed Net and the actual engine rotation speed Ne will be reduced based on the target engine rotation speed Net and the actual engine rotation speed Ne. Thus, it sets the feedback correction amount V2 so as to make the amount of increase Dne in engine rotation speed Ne agree with the target amount of increase Dnet.

When the hybrid ECU 30 determines at step 304 that the engine rotation speed Ne is not in the resonance frequency band, it executes step 312 and sets the torque correction amount V1 to zero. Thereafter, it executes step 313, and sets the feedback correction amount V2 to zero.

Thereafter, the hybrid ECU 30 executes step 314, and adds the torque correction amount V1 and the feedback correction amount V2 to the basic cranking torque Tcrkbs to determine the final cranking torque Tcrk.

$$Tcrk=Tcrkbs+V1+V2$$

The torque of the first MG 12 is so controlled as to produce this cranking torque Tcrk, and the torque of the first MG 12 is thereby feedback-controlled so as to make the amount of increase Dne in engine rotation speed Ne agrees with the target amount of increase Dnet. Thus, the amount of increase Dnet in engine rotation speed Ne is prevented from fluctuating.

The second embodiment takes the following measure when the engine 11 is cranked by the torque of the first MG 12 to start the engine 11: the torque of the first MG 12 is feedback-controlled so as to make the amount of increase Dne in engine rotation speed Ne agree with the target amount of increase Dnet, and the amount of increase in engine rotation speed Ne is thereby prevented from fluctuating. Therefore, fluctuation in the amount of increase in engine rotation speed can be reliably suppressed to reduce fluctuation in inertia torque without fail.

In the first and second embodiments, when the engine 11 is started by the torque of the first MG 12, the following measure is taken: when the engine rotation speed Ne is in the resonance frequency band, the torque of the first MG 12 is so controlled that the amount of increase Dne in engine rotation speed Ne is reduced. Instead, the following measure may be taken when the engine 11 is started by the torque of the first MG 12: the torque of the first MG 12 is so controlled that the amount of increase Dne in engine rotation speed Ne is reduced in all or part of the range during cranking.

In the first and second embodiments, it is checked whether or not the engine rotation speed Ne is in the resonance frequency band, based on the engine rotation speed Ne. Instead, it may be checked whether or not the engine rotation speed Ne is in the resonance frequency band, based on information that has correlation to the engine rotation speed. Examples of such information include the rotation speed of the first MG 12, the time that has passed after start of cranking, and the like.

The first and second embodiments are directed to control executed when the engine 11 is started by the torque of the first MG 12. Instead, the control may be executed when the engine 11 is stopped by the torque of the first MG 12. That is, the following measure may be taken when the engine 11 is stopped by the torque of the first MG 12: the torque of the first MG 12 is so controlled that the amount of decrease in engine rotation speed is reduced, and the amount of decrease in engine rotation speed is thereby made substantially constant to reduce fluctuation in inertia torque; fluctuation in inertia torque is reduced through this control of the torque of the first MG 12 to reduce fluctuation in the torque exerted on the drive axle 20; and further the torque of the second MG 13 is so controlled as to cancel out the torque (i.e., torque that does not fluctuate so much) exerted on the drive axle 20.

What is claimed is:

1. A control device for a hybrid electric vehicle, in which an internal combustion engine, a first motor-generator and a drive axle of wheels are coupled together through a power split device and a second motor-generator is coupled with the drive axle, the control device comprising:

first motor-generator torque controlling means that controls a torque of the first motor-generator so that a fluctuation of variation in a rotation speed of the internal combustion engine is reduced, when the internal combustion engine is in predetermined condition, which is at least one of starting and stopping of the internal combustion engine by the torque of the first motor-generator; and second motor-generator torque controlling means that controls a torque of the second motor generator to cancel out the torque exerted on the drive axle, when the internal combustion engine is in the predetermined condition;

wherein the first motor-generator torque controlling means corrects the torque of the first motor-generator variably according to a crankshaft angle of the internal combustion engine, and an amount of correction of the torque is variably determined to reduce the fluctuation of variation in the rotation speed of the internal combustion engine so that the rotation speed of the internal combustion engine changes at a substantially same rate.

2. The control device for a hybrid electric vehicle of claim 1, wherein:

the first motor-generator torque controlling means controls the torque of the first motor-generator so that the fluctuation of variation in the rotation speed of the internal combustion engine is reduced, when the internal combustion engine is started by the torque of the first motor-generator; and the second motor-generator torque controlling means controls the torque of the second motor-generator so as to cancel out the torque exerted on the drive axle, when the internal combustion engine is started by the torque of the first motor-generator.

3. The control device for a hybrid electric vehicle of claim 1, wherein:

the first motor-generator torque controlling means controls the torque of the first motor-generator so that the fluctuation of variation in the rotation speed of the internal combustion engine is reduced, when the internal combustion engine is stopped by the torque of the first motor-generator; and second motor-generator torque controlling means controls the torque of the second motor-generator to cancel out the torque exerted on the drive axle, when the internal combustion engine is stopped by the torque of the first motor-generator.

4. The control device for a hybrid electric vehicle of claim 1, wherein the first motor-generator torque controlling means feedback controls the torque of the first motor-generator so as to make the variation in the rotation speed of the internal combustion engine agree with a target variation in rotation speed, and thereby carries out control so that the fluctuation of variation in the rotation speed of the internal combustion engine is reduced.

5. The control device for a hybrid electric vehicle of claim 1, wherein the first motor-generator torque controlling means controls the torque of the first motor-generator so that the fluctuation of variation in the rotation speed of the internal combustion engine is reduced, when the rotation speed of the internal combustion engine is in a resonance frequency band.

6. The control device for a hybrid electric vehicle of claim 5, wherein the first motor-generator torque controlling means checks whether the rotation speed of the internal combustion engine is in the resonance frequency band based on the rotation speed.

7. A control device for a hybrid electric vehicle, in which an internal combustion engine, a first motor-generator and a drive axle of wheels are coupled together through a power split device and a second motor-generator is coupled with the drive axle, the control device comprising:

first motor-generator torque controlling means that controls a torque of the first motor-generator so that a fluctuation of variation in a rotation speed of the internal combustion engine is reduced, when the internal combustion engine is in predetermined condition, which is at least one of starting and stopping of the internal combustion engine by the torque of the first motor-generator; and second motor-generator torque controlling means that controls a torque of the second motor generator to cancel out the torque exerted on the drive axle, when the internal combustion engine is in the predetermined condition;

wherein both of the first motor-generator torque controlling means and the second motor-generator torque controlling means increase and decrease the torques thereof in correspondence to a latter half of a compression stroke and a former half of an explosion stroke of the internal combustion engine, respectively.

8. A control method for a hybrid electric vehicle, in which an internal combustion engine, a first motor-generator and a drive axle of wheels are coupled together through a power split device and a second motor-generator is coupled with the drive axle, the control method comprising:

starting to crank the internal combustion engine by a torque of the first motor-generator;

controlling the torque of the first motor-generator to increase and decrease in correspondence to a latter half of a compression stroke and a former half of an explosion stroke, respectively, during a cranking period so that a fluctuation of variation in a rotation speed of the internal combustion engine is reduced; and controlling a torque of the second motor-generator to increase and decrease in correspondence to an increase and a decrease of the torque of the first motor-generator, respectively, the second motor-generator driving the drive axle of wheels.

9. The control method for a hybrid vehicle of claim 8, wherein the controlling of the torques of the first motor-generator and the second motor-generator are executed during a period in which a rotation speed of the internal combustion engine is in a predetermined resonance frequency band.

10. The control device for a hybrid electric vehicle of claim 1, wherein the first motor-generator torque controlling means determines a basic cranking torque in accordance with at least a rotation speed of the internal combustion engine, and corrects the basic cranking torque by a correction amount, which increases before the crankshaft angle arrives a top dead center position of a piston of the internal combustion engine and decreases after the crankshaft angle arrives the top dead center position, so that the variation in the rotation speed of the internal combustion engine is made substantially constant.

* * * * *